(12) United States Patent
Frank et al.

(10) Patent No.: US 9,744,599 B2
(45) Date of Patent: Aug. 29, 2017

(54) TOOL HEAD FOR A MACHINE TOOL

(75) Inventors: Jochen Frank, Sachsenheim (DE);
Benno Spors, Marbach (DE)

(73) Assignee: KOMET GROUP GMBH, Besigheim (DE)

(*) Notice: Subject to any disclaimer, the term of this patent is extended or adjusted under 35 U.S.C. 154(b) by 369 days.

(21) Appl. No.: 14/234,299

(22) PCT Filed: Aug. 6, 2012

(86) PCT No.: PCT/EP2012/065319
§ 371 (c)(1),
(2), (4) Date: May 1, 2014

(87) PCT Pub. No.: WO2013/020941
PCT Pub. Date: Feb. 14, 2013

(65) Prior Publication Data
US 2014/0248099 A1    Sep. 4, 2014

(30) Foreign Application Priority Data

Aug. 9, 2011   (DE) .................. 10 2011 080 701

(51) Int. Cl.
*B23B 29/02*   (2006.01)
*B23B 29/034*   (2006.01)

(52) U.S. Cl.
CPC .. *B23B 29/03403* (2013.01); *B23B 29/03407* (2013.01); *B23B 2229/00* (2013.01);
(Continued)

(58) Field of Classification Search
CPC .......... B23B 29/03407; B23B 2250/04; B23B 29/03403; B23B 2260/03; B23B 2229/00;
(Continued)

(56) References Cited

U.S. PATENT DOCUMENTS

| | | |
|---|---|---|
| 3,710,659 A | 1/1973 | Pagella et al. |
| 3,795,454 A | 3/1974 | Elchyshyn |

(Continued)

FOREIGN PATENT DOCUMENTS

| | | |
|---|---|---|
| DE | 2010 200 | 9/1970 |
| DE | 2 247 612 | 4/1973 |

(Continued)

OTHER PUBLICATIONS

English Translation of International Preliminary Report on Patentability, issued in PCT/EP2012/065319 (5 pages).
(Continued)

*Primary Examiner* — Sunil K Singh
*Assistant Examiner* — Paul M Janeski
(74) *Attorney, Agent, or Firm* — Flynn, Thiel, Boutell & Tanis, P.C.

(57) ABSTRACT

A tool head having a main body (2) that is rotatable about a tool head axis (5), a slide (6) for holding a cutting tool, the slide (6) being guided on the main body (2) in a slide guide (8) in a linearly moveable manner transversely to the tool head axis (5), and a clamping device (48) for clamping the slide (6) on the main body (2). The clamping device (48) has a clamping body (50) that is adjustable parallel to the tool head axis (5), the clamping body (50), in a clamping position, pressing a sliding face (46) of the slide (6) against a guiding surface (44) of the slide guide (8) with a clamping force ($F_N$) being introduced.

16 Claims, 6 Drawing Sheets

(52) U.S. Cl.
CPC ....... *B23B 2250/04* (2013.01); *B23B 2260/03* (2013.01); *Y10T 408/21* (2015.01); *Y10T 408/44* (2015.01); *Y10T 408/76* (2015.01); *Y10T 408/85* (2015.01)

(58) Field of Classification Search
CPC ... Y10T 408/21; Y10T 408/44; Y10T 408/76; Y10T 408/85
See application file for complete search history.

(56) References Cited

U.S. PATENT DOCUMENTS

| | | | |
|---|---|---|---|
| 3,915,585 | A | 10/1975 | Eckle |
| 4,101,239 | A | 7/1978 | Wohlhaupter |
| 4,676,127 | A | 6/1987 | Watanabe |
| 4,899,628 | A | 2/1990 | Seichter et al. |
| 5,251,511 | A | 10/1993 | Muendlein et al. |
| 5,807,037 | A | 9/1998 | Schneider et al. |
| 6,134,996 | A | 10/2000 | Scheer et al. |
| 8,899,135 | B2 | 12/2014 | Frank et al. |

FOREIGN PATENT DOCUMENTS

| | | | | |
|---|---|---|---|---|
| DE | 39 18 914 | A1 | 12/1989 | |
| DE | 43 30 822 | A1 | 3/1995 | |
| DE | 10 2007 007 377 | A1 | 8/2008 | |
| DE | 10 2009 017 094 | A1 | 10/2010 | |
| DE | 102009017094 | A1 * | 10/2010 | ....... B23B 29/03403 |
| EP | 0 344 616 | A1 | 12/1989 | |
| EP | 0 491 724 | B1 | 7/1992 | |
| EP | 2 033 727 | A1 | 3/2009 | |
| JP | 48-99780 | | 12/1973 | |
| WO | WO 97/41988 | | 11/1997 | |

OTHER PUBLICATIONS

English Translation of International Search Report issued in PCT/EP2012/065319, with a mailing date of Oct. 31, 2012 (3 pages).
German Search Report for corresponding application No. 10 2011 080 701.2, dated May 21, 2012, with English translation (10 pgs).
Japanese Office Action for corresponding application No. 2014-524351, dated May 10, 2016, with English translation (11 pgs).

* cited by examiner

TOOL HEAD FOR A MACHINE TOOL

BACKGROUND OF THE INVENTION

The invention relates to a tool head for a machine tool.

DESCRIPTION OF THE PRIOR ART

EP 0 491 724 B1 discloses a tool head for use in machine tools, having a slide for holding a cutting tool. In order to adjust the slide, provision is made of an adjusting spindle which is engaged with helical gearing formed on the slide.

In order that a slide with a cutting tool can be set precisely in a tool head of the type mentioned at the outset, it is necessary for the slide to be guided in the tool head in a manner which is as play-free as possible and at the same time also has a low friction. If the guidance is too imprecise, a cutting tool held on the slide can be adjusted in a self-acting and uncontrolled manner in the machine tool. On the machine spindle, which rotates in the rotational speed range of, for example, 20,000 revolutions per minute, the slide is exposed to large forces which act as centrifugal forces and cutting forces on the cutting tool. The risk of self-acting adjustment of the slide occurs in particular when the cutting tool is not engaged with the workpiece. A problem when securing the slide with high clamping forces is that the accuracy of slide positioning and position detection can be impaired.

OBJECT OF THE INVENTION

On this basis, the invention is based on the object of further improving the apparatus known from the prior art and to provide a tool head having a slide, in which the slide is settable very precisely and remains precisely positioned in use, even at very large cutting forces and centrifugal forces that occur during machining workpieces at high rotational speeds.

In order to achieve this object, the combination of features specified below is proposed. Advantageous configurations and further developments of the invention can also be gathered from below.

SUMMARY OF THE INVENTION

The invention is based on the idea of applying a clamping force acting parallel to the tool head axis to the slide in a virtually deformation-free manner. Accordingly, it is proposed, according to the invention, that the clamping device has a clamping body which is adjustable parallel to the tool head axis and, in a clamping position, presses a sliding surface of the slide against a guiding surface of the slide guide with a clamping force being introduced. Since the direction of the clamping force that is introducible into the slide with the clamping device is parallel to the tool head axis, the deformation forces that occur when the slide is clamped and have a force component that extends transversely to the tool head axis can be kept small. This also has the effect that the direction of the clamping force acting on the slide is not changed when the slide is secured in the slide guide and that the slide is not displaced in the slide guide during clamping.

Preferably, the clamping body is adjustable in a linear guide formed in the main body at a lateral distance from the tool head axis, such that the direction of the force introduction is precisely defined.

According to a further advantageous configuration, in order to introduce a clamping force ($F_N$) into the slide, the clamping body bears as a two-sided lever on an abutment surface of the slide and an abutment surface of the main body. With this measure, large forces parallel to the tool head axis can be introduced into the slide guide formed on the tool head.

It is favorable for force transmission for the abutment surface on the slide and the abutment surface on the main body to be located in a common plane or in planes that are parallel to one another, and for the clamping body to have clamping runners, projecting beyond a foot surface, for transmitting force to the slide and the main body.

In order to press the clamping body against the abutment surface on the slide and the abutment surface on the main body, the clamping device contains a clamping screw that passes through the clamping body and is screwable into the main body preferably from the end side thereof. By way of such a clamping screw, the clamping forces acting on the slide can be set easily and very exactly.

Since the clamping device has a spring element supported on the clamping body, in particular a disk spring for the damped build-up of a clamping force ($F_N$), it is possible to ensure that the clamping forces that act on the slide rise gently during clamping, such that said slide is not displaced and cannot tilt in the slide guide during clamping.

Advantageously, the adjustment axis of the clamping body and the tool head axis define a plane perpendicular to the direction of movement of the slide.

A further important aspect of the invention resides in a measuring device for automatically detecting the position of the slide, said measuring device being arranged at a distance from the tool head axis in the direction of movement of the slide. On account of this positioning, disadvantageous influences of the slide clamping on position determination which is as precise as possible can be largely avoided. In this case, it is favorable for the center of the measuring device and the adjustment axis of the clamping body to be located at approximately the same distance from the tool head axis. Differences in distance of up to 10% are intended to be understood by the expression "approximately the same distance".

A further improvement with respect to robust measurement can be achieved in that the measuring device detects the position of the slide in a region of the slide guide that is located in a plane perpendicular to the tool head axis.

It is also advantageous for the measuring device to have a position sensitive sensor module for absolute detection of the position of the slide, so that self-acting loss of adjustment of the measuring device, in particular in the switched-off state, is avoided and any deviations from the required position are reliably measured and displayed.

To this end, the measuring device may have a preferably two-dimensionally spatially resolving photodiode as a light sensor for detecting the position of a light spot produced by means of a point light source. The light source may be arranged on the slide or the main body, while conversely the position sensitive light sensor is held on the main body or the slide. It is also conceivable for the measuring device to contain a capacitive or inductive position sensor.

Advantageously, at least one counterweight piece, permanently coupled in the opposite direction to the slide, for unbalance compensation is arranged in the main body. In this case, particularly constructive advantages can be achieved in that the clamping body acts only on the slide and the counterweight piece is self-locking under the action of the centrifugal force during rotation of the main body.

Since the slide guide, formed in the main body, for the slide is secured against spreading open by means of a cover element or reinforcement part which has one or more crosspieces which engage over the slide, a secure fit of the slide in the tool head and thus precise and vibration-free workpiece machining can be ensured even at high rotational speeds.

If the main body has a central bore that passes through as far as the slide and has an opening to a duct extending in the slide, it is possible to apply cooling lubricant to a cutting tool held on the slide through the main body.

Preferably, in order for the slide to move in the linear guide, provision is made of an adjusting device which moves the slide counter to a restoring force. This restoring force is generated by a force generating means which is supported on the main body and acts on the slide. The force generating means may be in the form for example of a spring. In particular, a rotatable sleeve which acts by means of a thread on a connection element which is coupled to the slide, is in the form of a pin and is movable along an adjustment axis intersecting the tool head axis is suitable as the adjustment device for the slide. Preferably, the pin has a toothing section which meshes with a toothing section, complementary thereto, formed on the slide and which brings about a rotationally fixed connection of the slide and pin. This makes it possible to avoid the pin being detached from the slide if an accidental overtorque is introduced into the adjusting device for the slide, for example if the slide is blocked. It is advantageous to provide displaceability of the slide transversely to the tool head axis and thus to ensure that the normal force ($F_N$) that is introducible into the slide by means of the clamping device has a force component parallel to the tool head axis. As a result, the adjusting device for the slide is not stressed by clamping forces.

Preferably, the slide consists of high-strength aluminum. It is favorable for the slide to have a hardened surface having an oxide layer.

Furthermore, it is favorable for the slide to be formed with a plurality of differently standardized interfaces for securing cutting tools. Then, different cutting tools which correspond to different interface standards can be operated on the tool head.

BRIEF DESCRIPTION OF THE DRAWINGS

The invention is explained in more detail in the following text with reference to the exemplary embodiment illustrated schematically in the drawing, in which.

DETAILED DESCRIPTION OF THE INVENTION

Figure 1:
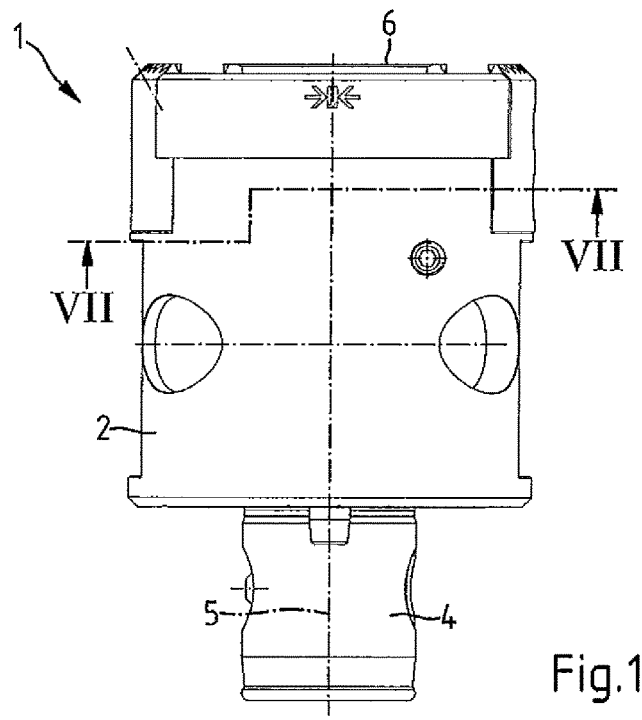
FIG. 1 and FIG. 2 show two different side views of a tool head having a slide.
Figure 2:
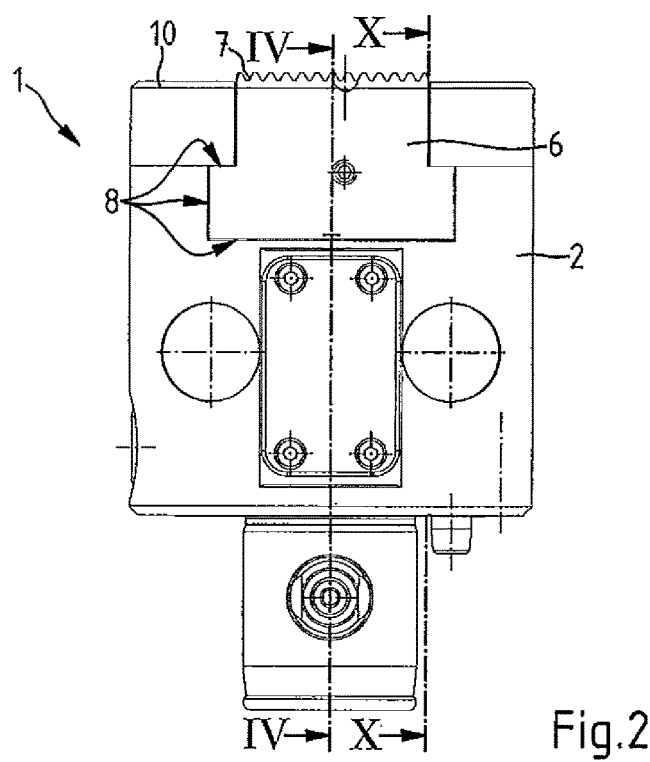

The tool head 1 illustrated in FIGS. 1 and 2 serves to hold cutting tools and is designed for connection to the rotating machine spindle of a machine tool. The tool head 1 comprises a main body 2 on which a movable slide 6 is held. The slide 6 is guided in a linearly movable manner in a slide guide 8 formed on the main body 2 and has a toothing section 7 for holding a cutting tool (not illustrated in more detail). In order to be connected to the machine spindle, the main body 2 is provided with a locating pin 4. The tool head 1 has a tool head axis 5 which acts as a rotation axis on connection to the rotating machine spindle of the machine tool.

Figure 3:
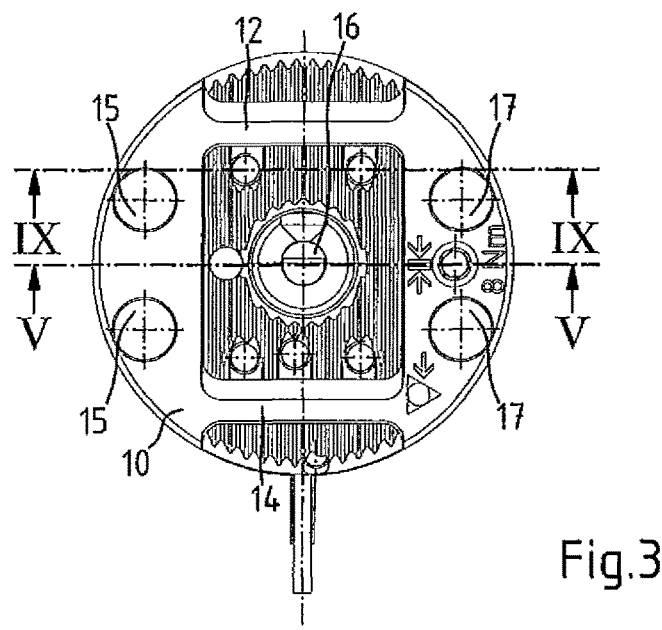
FIG. 3 shows a plan view of the tool head.

As FIG. 3 shows, the slide guide 8 for the slide 6 comprises a cover element 10. The slide 6 is guided under the cover element 10 in the slide guide 8. The cover element 10 has crosspieces 12, 14 which engage over the slide 6 and is secured to the main body 2 by means of screws 15, 17. The cover element 10 stabilizes the slide guide 8 for the slide 6 in the main body 2.

Figure 4:
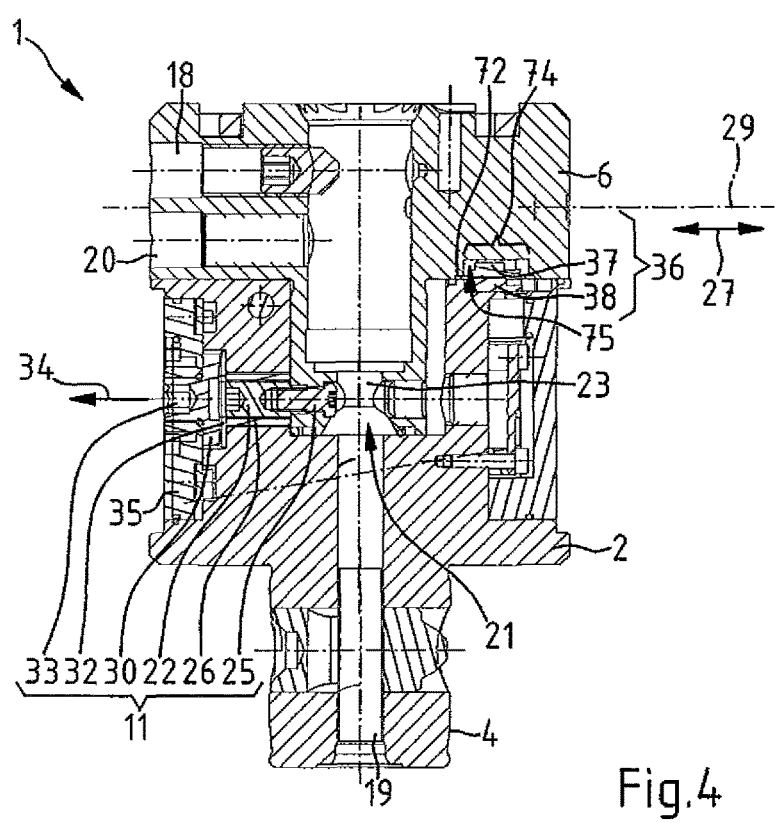
FIG. 4 shows a section through the tool head along the line IV-IV in FIG. 2.

Formed in the slide 6 is a bore 16 for holding a cylindrical shank of the cutting tool. The bore 16 makes it possible to hold cutting tools on the slide 6 with different interfaces. To this end, as FIG. 4 shows, there is a recess 18 in the slide 6 for a first clamping mechanism and, offset in relation thereto, a recess 20 for a second clamping mechanism.

Figure 5:
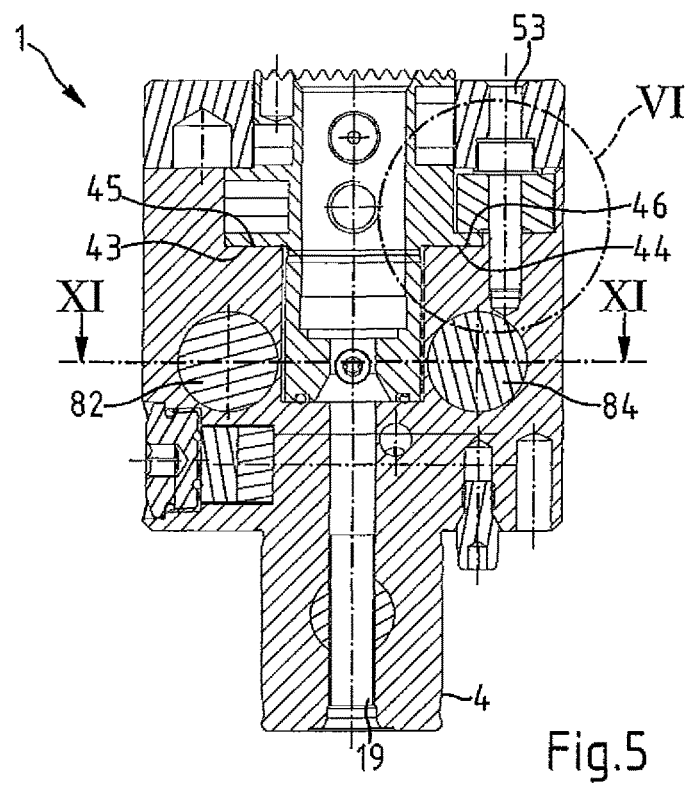
FIG. 5 shows a section through the tool head along the line V-V in FIG. 3.

The slide guide 8 is in the form of a friction bearing. As FIG. 5 shows, the slide guide 8 is formed with guiding surfaces 43, 44. The guiding surfaces 43, 44 bear against sliding surfaces 45, 46 of the slide 6.

The tool head 1 comprises displaceable counterweights 82, 84. The counterweights 82, 84 are coupled to the slide 6. The counterweights 82, 84 serve to compensate for the unbalance which is caused by the displacement of the slide 6 in the tool head.

The tool head 1 contains an adjusting device 11 for the slide 6. The adjusting device 11 comprises a threaded bush 26 which has an engagement point 33 for a hex key. The adjusting device 11 can thus be actuated by means of a hex key.

The threaded bush 26 acts on a threaded pin 22 which is secured to the slide 6 via a screw 25. The threaded pin 22 has an external thread which is engaged with an internal thread formed on the threaded bush 26. By rotating the threaded bush 26, the slide 6 can be moved in accordance with the double arrow 27 along the movement axis 29. By means of the abovementioned toothing sections, a rotationally fixed connection of the threaded pin 22 to the slide 6 is brought about, such that the slide and the threaded pin 22 cannot be detached in a self-acting manner even if an accidental overtorque is introduced into the threaded bush 26, for example if the slide is blocked.

The threaded bush 26 has a section 30 formed with a flange shape, said section 30 being supported against a disk spring 32 on the main body 2 of the tool head 1. The disk spring 32 presses the section 30 of the threaded bush 26 in the direction of the arrow 34 against a cover element 35 which is secured to the main body 2.

In the main body 2 of the tool head 1, there is a bore 19 which extends through the locating pin 4 and passes through as far as the slide 6 in the slide guide 8. At that point, the bore 19 leads into a funnel-shaped section 21 of a duct 23 formed in the slide 6. The duct 23 connects the bore 16 for holding cutting tools to the slide 6 having the bore 19 in the main body 2. Through the bore 19 extending through the locating pin 4, cooling lubricant of the tool head 1 can thus be supplied to a cutting tool held on the slide 6. The funnel-shaped section 21, widening toward the bore 19, of the duct 23 formed in the slide 6 ensures in this case that when the slide 6 is displaced on the main body 2, in the tool head 1, the effective opening cross-section for the passage of cooling lubricant to a cutting tool is substantially independent of a setting of the slide 6 and a harmonious profile favoring the passage of the cooling lubricant forms.

Figure 6:
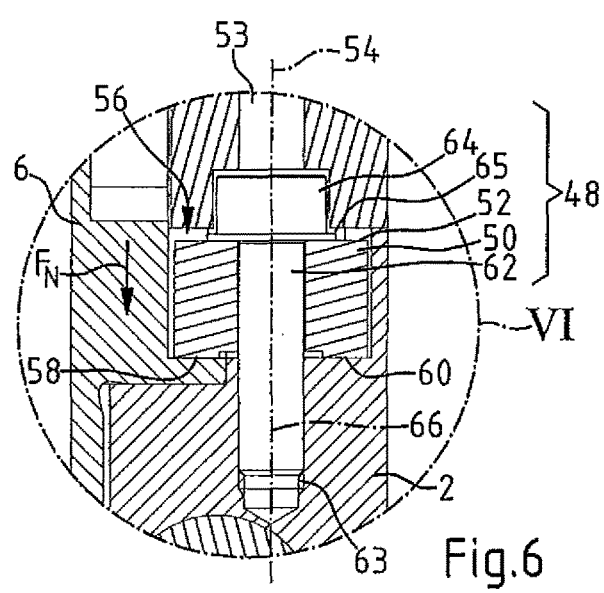
FIG. 6 shows a detail from FIG. 5, in which an adjusting device for the slide is shown on a larger scale.

FIG. 6 shows a detail of the slide 6 in the tool head 1 with the guiding surface 44 of the slide guide 8. The guiding surface 44 can be subjected, by means of a clamping device 48 held on the main body 2, to a clamping force $F_N$ that secures the slide 6 in the main body 2. The clamping force $F_N$ generated by the clamping device 48 presses the sliding surface 46 of the slide 2 against the guiding surface 44. The direction of the clamping force $F_N$ that is introducible into the slide 6 by way of the clamping device 48 is parallel to the tool head axis 5. The slide 6 is guided in a linearly movable manner in the slide guide 8 with a movement axis 29 that is perpendicular to both the rotation axis 5 and the direction of the clamping force $F_N$ that is introducible into the slide 6 by way of the clamping device 48.

The clamping device 48 has a clamping body 50 which is arranged in a linear guide 52, formed in the main body 2 and distinct therefrom, having a movement axis 54 parallel to the tool head axis 5. The clamping body 50 guided in a linearly movable manner in the linear guide 52 projects into a cutout 56 formed on the slide 6. In order to introduce a clamping force $F_N$ into the slide 6, the clamping body 50 bears on an abutment surface 58 formed on the slide 6 and an abutment surface 60 formed on the main body 2. To this end, the clamping body 50 has stepped clamping runners on its foot surface, such that positioning tolerances can be compensated better. The abutment surface 60 is parallel to the abutment surface 58 on the slide 6. The clamping device 48 contains a clamping screw 62 passing through the clamping body 50. The clamping screw 62 is anchored in a thread 63 formed in the main body 2. The clamping screw 62 can be adjusted by means of a hex key through a bore 53 in the cover element 10. By way of the clamping screw 62, the clamping body 50 can be pressed against the abutment surface 58 on the slide 6 and the abutment surface 60 on the main body 2. Expediently, the abutment surfaces 58, 60 on the clamping body 50 can be configured in a rounded or spherical manner, and as a result tolerances of the impinged opposing faces can be bridged.

The clamping screw 62 has a screw head 64 which acts on a disk spring 65 which bears against the clamping body 60. The disk spring 65 ensures a gradual and constant increase in the clamping force $F_y$ which is introduced into the slide 6 by the clamping body 50 when the clamping screw 62 is secured. The axis 66 of the clamping screw 62 and the tool head axis 5 define a plane perpendicular to the direction of movement 29 of the slide 6.

As FIG. 4 shows, the tool head 1 contains a measuring device 36 for detecting the setting of the slide 6. The measuring device 36 comprises a light source 37 which is secured in a recess 75 on a section 74 of the slide 6. This light source 37 is assigned a PSD module (Position Sensitive Device) 38 held on the main body 2. The PSD module contains a position sensitive light sensor. By means of the PSD module 38, the position of the light source 37 and thus the position of the slide 6 can be detected electronically.

Figure 7:
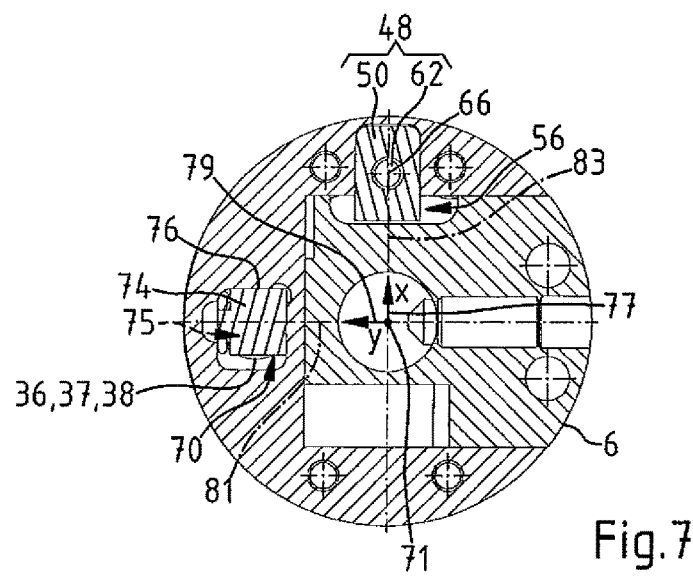
FIG. 7 shows a section through the tool head along the line VII-VII in FIG. 1.

In the slide-based coordinate system illustrated in FIG. 7, which has a z-axis 71 parallel to the tool head axis 5, the straight line 83, parallel to the x-axis 77, through the tool head axis 5 is directed to the side of the cutout 56 and passes through the clamping device 48. In such a coordinate system, the recess 75 in the slide 6 is arranged on a straight line 81 parallel to the y-axis 79 of this coordinate system, said straight line 81 intersecting the tool head axis 5. In this case, the distance of the cutout 56 from the z-axis of this coordinate system corresponds approximately to the distance of the recess 76 in the slide 6 from the z-axis of the coordinate system. This measure ensures that the clamping of the slide 6 does not deform the body of the slide 6 in the region of the recess 75 in the direction of the y-axis 79 of the coordinate system. The measuring device 36, on the one hand, and the clamping device 48, on the other, are thus located in main stiffness axes of the tool head 1 that are different from one another.

The measuring device 36 detects the position of the slide 6 in a region 70 of the slide guide 8. In the region 70, the sliding surface 72, shown in FIG. 4, of the slide 6 in the slide guide 8 is located in a plane perpendicular to the tool head axis 5. The recess 75 in the section 74 of the slide 6 is surrounded by the sliding surface 72.

In the region, surrounding the section 74, of the slide 6, the body of the slide 6 is solid and not weakened by recesses or bores. As a result, the measurement signal captured by the measuring device 36 is dependent on the clamping force $F_N$ introduced into the slide.

Figure 8:
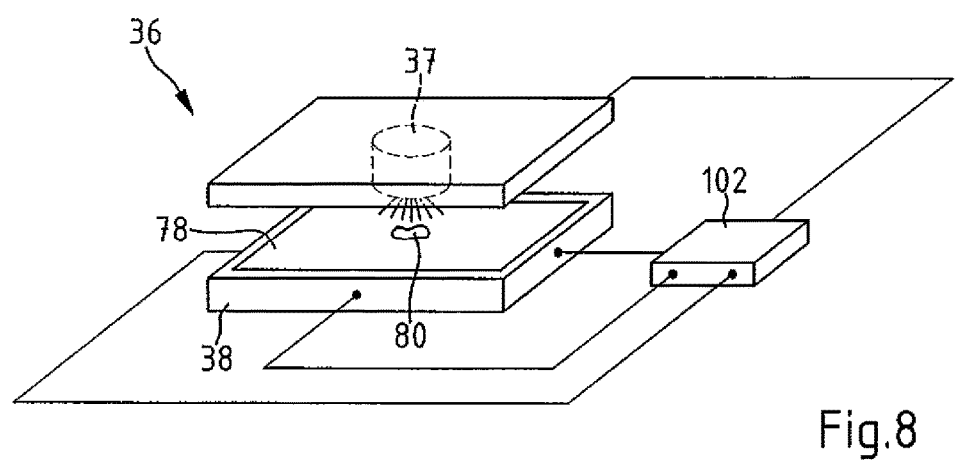
FIG. 8 shows a measuring device in the tool head.

FIG. 8 shows a schematic view of the measuring device 36 in the tool head 1. The light source 37 in the measuring device 36 generates a light spot 80 on the position sensitive light sensor 78 of the PSD module 38. The measuring device 36 is connected to an evaluation circuit 102. A two-dimensional voltage signal Q1 ($U_1$, $U_2$) can be detected by way of the evaluation circuit 102, said signal containing the information relating to the position of the light spot 80 on the light sensor 78.

Figure 9:
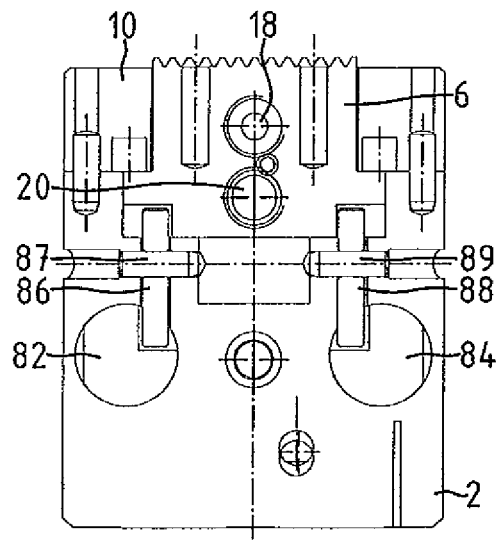
FIG. 9 shows a section through the tool head along the line IX-IX in FIG. 3.
Figure 10:
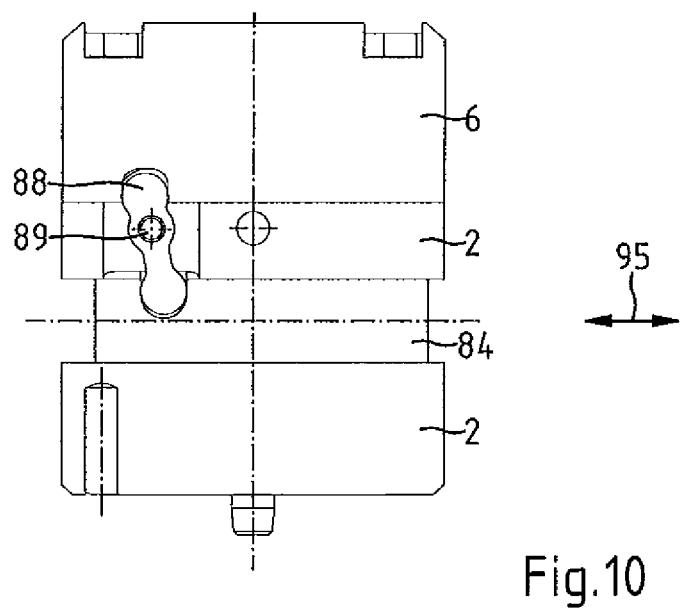
FIG. 10 shows a section through the tool head along the line X-X in FIG. 2.

In order to couple the counterweights 82, 84 to the slide 6, the tool head 1 contains two pivot levers 86, 88, which can be seen in FIG. 9 and FIG. 10. The pivot levers 86, 88 are mounted in a pivotable manner on shafts 87, 89 in the main body 2. By means of the pivot levers 86, 88, the counterweights 82, 84 are permanently coupled in opposite directions to the slide 6. In this way, the counterweights 82, 84 effect unbalance compensation when the slide 6 is moved.

Figure 11:
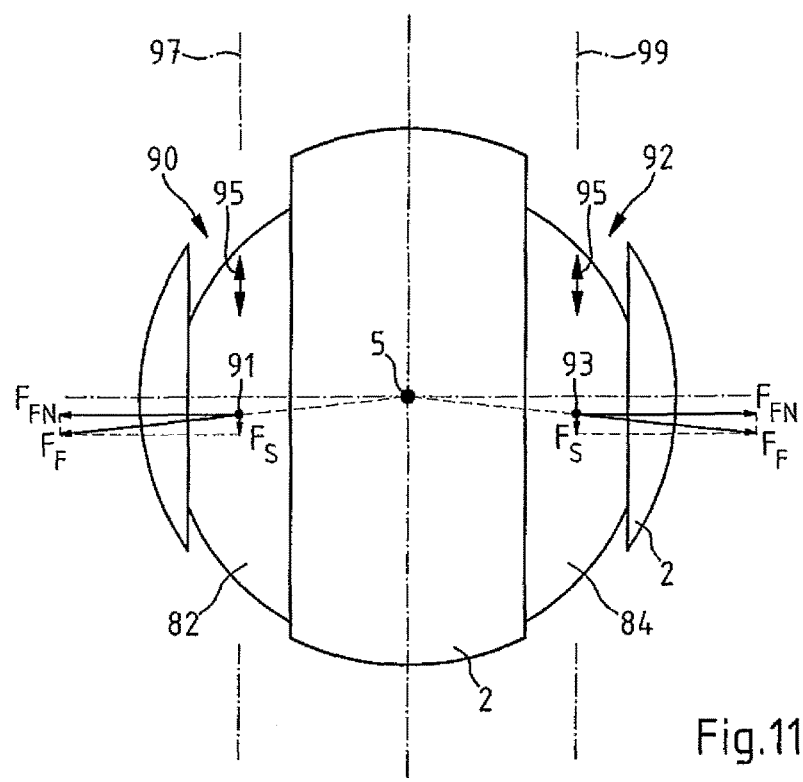
FIG. 11 shows a section through the tool head along the line XI-XI in FIG. 5.

FIG. 11 shows the counterweights 82, 84 in a longitudinal section in a plane perpendicular to the tool head axis 5. The counterweights 82, 84 have a cylindrical lateral surface and are guided in bores 90, 92 on the main body of the tool head 1. Therein, on account of the coupling to the slide 6 by the pivot levers 86, 88, they are moved in opposite directions on the slide 6 in the direction of the double arrows 90, 92.

The centrifugal force $F_F$ which acts at the center of gravity 91, 93 of the counterweights 82, 84 in the event of a rotation of the tool head 1 about the tool head axis 5 has a normal force component $F_{FN}$ which presses the counterweights against the outwardly directed regions of the bores 90, 92 in the main body 2 of the tool head 1. In the displacement region, defined by the geometry of the pivot levers 86, 88, for the counterweights 82, 84, the normal force component $F_{FN}$ brings about a frictional force $F_R$ which counteracts a self-acting movement of the counterweights 82, 84 in the bores 90, 92. The frictional force $F_R$ is in this case always greater than the component $F_S$ of the centrifugal force $F_F$ that acts at the center of gravity 91, 93 in the direction of the axis 97, 99 of the bores 90, 92. As a result, self-locking guidance of the counterweights 82, 84 in the bores 90, 92 is achieved.

The invention claimed is:

1. A tool head for a machine tool, having a main body which is rotatable about a tool head axis, a slide for holding a cutting tool, said slide being guided on the main body in a slide guide in a linearly movable manner transversely to the tool head axis, and a clamping device for clamping the slide on the main body, wherein the clamping device has a clamping body which is distinct from the main body, adjustable parallel to the tool head axis and, in a clamping position, presses a sliding surface of the slide against a guiding surface of the slide guide with a clamping force $F_N$ being introduced, characterized in that in order to introduce a clamping force $F_N$ into the slide, the clamping body bears as a two-sided lever on an abutment surface of the slide and an abutment surface of the main body and at least one counterweight piece, permanently coupled in the opposite direction to the slide, for unbalance compensation is arranged in the main body, wherein the clamping body acts only on the slide and the counterweight piece is self-locking under the action of the centrifugal force during rotation of the main body.

2. The tool head as claimed in claim 1, characterized in that the clamping body is adjustable in a linear guide formed in the main body at a lateral distance from the tool head axis.

3. The tool head as claimed in claim 1, characterized in that the abutment surface on the slide and the abutment surface on the main body are located in a common plane or in planes that are parallel to one another.

4. The tool head as claimed in claim 1, characterized in that the clamping body has clamping runners, projecting beyond a foot surface, for transmitting force to the slide and the main body.

5. The tool head as claimed in claim 1, characterized in that the adjustment axis of the clamping body and the tool head axis define a plane perpendicular to the direction of movement of the slide.

6. The tool head as claimed in claim 1, characterized by a measuring device, arranged at a distance from the tool head axis in the direction of movement of the slide, for detecting the position of the slide.

7. The tool head as claimed in claim 6, characterized in that the measuring device and the adjustment axis of the clamping body are located at approximately the same distance from the tool head axis.

8. The tool head as claimed in claim 6, characterized in that the measuring device detects the position of the slide in a region of the slide guide that is located in a plane perpendicular to the tool head axis.

9. The tool head as claimed in claim 6, characterized in that the measuring device has a position sensitive sensor module for absolute detection of the position of the slide.

10. The tool head as claimed in claim 6, characterized in that the measuring device has a spatially resolving light sensor for detecting the position of a light spot produced by means of a point light source.

11. The tool head as claimed in claim 1, characterized in that at least one counterweight piece, permanently coupled in the opposite direction to the slide, for unbalance compensation is arranged in the main body, wherein the clamping body acts only on the slide and the counterweight piece is self-locking under the action of the centrifugal force during rotation of the main body.

12. The tool head as claimed in claim 1, characterized in that the slide guide is stabilized by means of a reinforcement part that engages at least sectionally over the slide and is anchored in the main body.

13. The tool head as claimed in claim 1, characterized in that the main body has a central bore that passes through as far as the slide and has an opening to a duct extending in the slide in order to apply cooling lubricant to a cutting tool held on the slide.

14. The tool head as claimed in claim 13, characterized in that the duct in the slide has a section that widens preferably in the form of a funnel toward the central bore in the main body, so that the cooling lubricant can pass through in a trouble-free manner.

15. A tool head for a machine tool, having a main body which is rotatable about a tool head axis, a slide for holding a cutting tool, said slide being guided on the main body in a slide guide in a linearly movable manner transversely to the tool head axis, and a clamping device for clamping the slide on the main body, wherein the clamping device has a clamping body which is distinct from the main body, adjustable parallel to the tool head axis and, in a clamping position, presses a sliding surface of the slide against a guiding surface of the slide guide with a clamping force $F_N$ being introduced, characterized in that in order to introduce a clamping force $F_N$ into the slide, the clamping body bears as a two-sided lever on an abutment surface of the slide and an abutment surface of the main body and the clamping device contains a clamping screw that passes through the clamping body and is screwable into the main body.

16. A tool head for a machine tool, having a main body which is rotatable about a tool head axis, a slide for holding a cutting tool, said slide being guided on the main body in a slide guide in a linearly movable manner transversely to the tool head axis, and a clamping device for clamping the slide on the main body, wherein the clamping device has a clamping body which is distinct from the main body, adjustable parallel to the tool head axis and, in a clamping position, presses a sliding surface of the slide against a guiding surface of the slide guide with a clamping force $F_N$ being introduced, characterized in that in order to introduce a clamping force $F_N$ into the slide, the clamping body bears as a two-sided lever on an abutment surface of the slide and an abutment surface of the main body and the clamping device has a spring element supported on the clamping body for the damped build up of a clamping force $F_N$.

* * * * *